(12) United States Patent
Richiuso et al.

(10) Patent No.: US 9,194,493 B2
(45) Date of Patent: Nov. 24, 2015

(54) FILTER CLAMP LOCK

(75) Inventors: Leonard Richiuso, Raleigh, NC (US); Paul Hopfer, Holly Springs, NC (US)

(73) Assignee: Pentair Water Pool and Spa, Inc., Sanford, NC (US)

( * ) Notice: Subject to any disclaimer, the term of this patent is extended or adjusted under 35 U.S.C. 154(b) by 920 days.

(21) Appl. No.: 13/249,606

(22) Filed: Sep. 30, 2011

(65) Prior Publication Data
US 2013/0081256 A1   Apr. 4, 2013

(51) Int. Cl.
A44B 1/04 (2006.01)
F16J 13/06 (2006.01)
F16B 2/08 (2006.01)
F16B 21/06 (2006.01)

(52) U.S. Cl.
CPC .................. F16J 13/065 (2013.01); *F16B 2/08* (2013.01); *F16B 21/065* (2013.01); *Y10T 24/1412* (2015.01); *Y10T 29/49959* (2015.01); *Y10T 74/18808* (2015.01)

(58) Field of Classification Search
CPC ......... F16L 33/035; F16L 33/12; F16L 33/02; F16L 33/085; B65D 63/06; B65D 63/1063; F16B 2/10; Y10T 24/1422; Y10T 24/14; Y10T 24/1412; Y10T 24/1463; Y10T 24/1482; Y10T 24/2187
USPC ....... 24/272, 280, 281, 278, 279, 20 TT, 269; 74/89.17; 269/210, 214, 215
See application file for complete search history.

(56) References Cited

U.S. PATENT DOCUMENTS

| 63,468 | A | * | 4/1867 | Card | 269/90 |
|---|---|---|---|---|---|
| 1,000,992 | A | * | 8/1911 | Cooper | 24/286 |
| 1,435,684 | A | | 11/1922 | Anderson | |
| 1,490,181 | A | * | 4/1924 | Ohlson | 254/230 |
| 1,516,748 | A | * | 11/1924 | Modee | 254/237 |
| 2,162,396 | A | | 6/1939 | Eggerss | |
| 2,695,437 | A | | 11/1954 | Bernard | |
| 2,920,512 | A | * | 1/1960 | Furey | 140/150 |
| 3,352,539 | A | * | 11/1967 | Witt | 410/23 |
| 3,730,480 | A | | 5/1973 | Moyer | |
| 3,817,564 | A | | 6/1974 | Baldwin et al. | |
| 3,852,855 | A | | 12/1974 | Bengtsson | |

(Continued)

FOREIGN PATENT DOCUMENTS

| DE | 2004002416 | 5/2004 |
|---|---|---|
| GB | 1561086 | 2/1980 |

OTHER PUBLICATIONS

Hayward Pool Products, Inc.; "SwimClear Cartridge Filter Series Owners Guide;" 2000; pp. 1-8; ISC2020-00; Elizabeth, NJ USA.

(Continued)

*Primary Examiner* — Victor Batson
*Assistant Examiner* — Matthew Sullivan
(74) *Attorney, Agent, or Firm* — Quarles & Brady LLP

(57) ABSTRACT

Embodiments of the invention provide a clamp lock to secure a clamp around a pressure vessel, such as a split tank pool filter. The clamp lock includes a drive rack with at least one notch, and a housing with a rotatable drive gear, a locking pawl, and a receiving hole. The rotatable drive gear is capable of laterally moving the drive rack through the receiving hole, and the locking pawl is capable of engaging the at least one notch when the drive rack has been inserted a distance into the receiving hole. The distance correlates to a diameter of the clamp sufficient to secure the clamp around the pressure vessel.

13 Claims, 5 Drawing Sheets

(56) References Cited

U.S. PATENT DOCUMENTS

| | | | |
|---|---|---|---|
| 4,249,786 A | 2/1981 | Mahoff | |
| 4,388,991 A | 6/1983 | Price | |
| 4,468,842 A | 9/1984 | Perry et al. | |
| 4,546,524 A * | 10/1985 | Kreft | 24/274 R |
| 4,675,949 A * | 6/1987 | DaCosta | 24/269 |
| 4,732,294 A | 3/1988 | Bohler et al. | |
| 4,900,070 A | 2/1990 | Runkles et al. | |
| 4,968,077 A | 11/1990 | Redmon, Jr. et al. | |
| 5,048,881 A | 9/1991 | Renfro | |
| 5,188,400 A | 2/1993 | Riley et al. | |
| 5,548,876 A | 8/1996 | Oetiker | |
| 5,661,876 A * | 9/1997 | Goldenberg | 24/19 |
| 6,622,347 B1 | 9/2003 | Cottrill et al. | |
| 6,760,985 B2 | 7/2004 | Wilson | |
| 6,898,825 B1 | 5/2005 | Charest | |
| 7,001,159 B2 | 2/2006 | Peterson, Jr. et al. | |
| 7,081,200 B2 | 7/2006 | Valis | |
| 7,794,591 B2 | 9/2010 | Nibler et al. | |
| 7,815,796 B2 | 10/2010 | Nibler et al. | |
| 8,137,545 B2 | 3/2012 | Nibler et al. | |
| 2004/0040186 A1 | 3/2004 | Wilson | |
| 2009/0266119 A1 | 10/2009 | Brojanac et al. | |
| 2010/0115738 A1 * | 5/2010 | Kuhne et al. | 24/271 |
| 2010/0162539 A1 * | 7/2010 | Rancon | 24/70 ST |
| 2010/0199463 A1 | 8/2010 | Kudo | |
| 2010/0219185 A1 | 9/2010 | Griffin et al. | |
| 2011/0089094 A1 | 4/2011 | Nibler et al. | |

OTHER PUBLICATIONS

Hayward Pool Products; "SwimClear Cartridge Filters Owners Manual;" 2008; pp. 1-12; ISC2028 Rev C; www.haywardpool.com.

Jandy Pool Products, Inc.; "Installation and Operation Manual—CL and CV Versa-Plumb Series Filters;" 2008; pp. 1-20; Moorpark, CA USA.

* cited by examiner

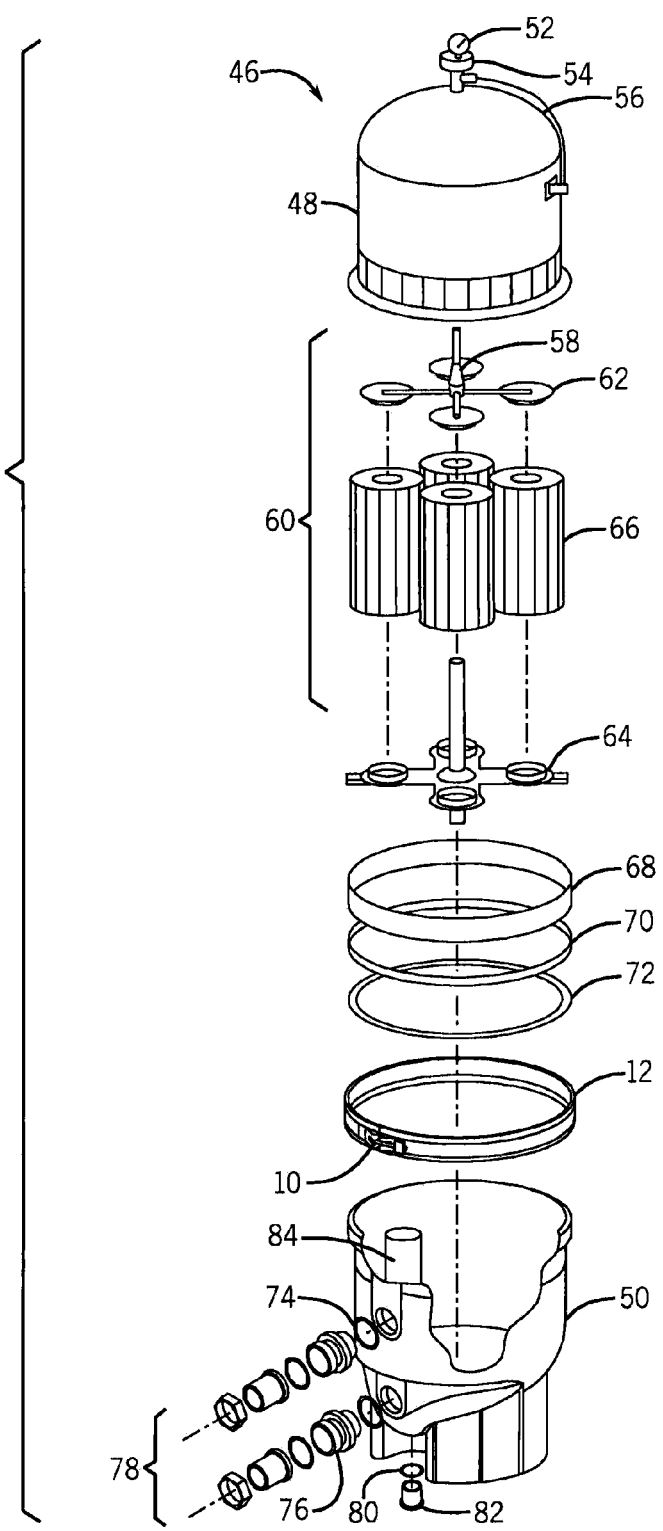

FILTER CLAMP LOCK

BACKGROUND

Pressure vessels, such as split tank filters or split pump housings, often include two components that can be separated for cleaning, maintenance, filter replacement, etc. Clamps or other types of locking members are used to secure the two components (e.g., a top unit and a bottom unit) together during operation of the pressure vessel. If the clamp fails, for example due to improper positioning or insufficient fastening, pressure built up in the pressure vessel can cause the components to separate with substantial force.

Conventional band clamps used to secure a pressure vessel include a threaded rod, which is either threaded through both ends of the band clamp or secured to one end of the band clamp and threaded through a second end of the band clamp. One or more nuts is threaded along the rod (e.g., against one or both ends of the band clamp) in order to tighten the band clamp around the pressure vessel. This type of nut and thread combination provides an infinite number of "locked" positions. As a result, a user must estimate the proper amount of tightening required to sufficiently lock the band clamp (i.e., to prevent separation of the pressure vessel during operation). If the band clamp is not tightened enough, the pressure vessel may not be properly sealed at the junction between the top unit and the bottom unit, resulting in possible separation. If the band clamp is tightened too much, portions of the band clamp may undergo additional stresses which can cause the band clamp to break or otherwise fail, also resulting in possible separation.

SUMMARY

Some embodiments of the invention provide a clamp lock to secure a clamp. The clamp lock includes a drive rack and a housing. The housing includes a receiving hole extending at least partially through the housing to receive the drive rack, a rotatable drive gear to engage a portion of the drive rack and permit lateral movement of the drive rack through the receiving hole, and a locking pawl. The locking pawl is moveable between a first position that engages the drive rack and substantially prevents lateral movement of the drive rack in at least one direction through the receiving hole, and a second position that is spaced away from the drive rack and permits lateral movement of the drive rack in two directions through the receiving hole.

Other embodiments of the invention provide a clamp lock that secures together a clamp around a pressure vessel. The clamp lock includes a drive rack with at least one notch and a toothed portion. The clamp lock also includes a housing with a rotatable drive gear, a locking pawl, and a receiving hole extending through the housing to receive the drive rack. The rotatable drive gear is capable of engaging the toothed portion to laterally move the drive rack through the receiving hole, and the locking pawl is capable of engaging the at least one notch when the drive rack has been inserted a first distance into the receiving hole. The first distance correlates to a first diameter of the clamp sufficient to secure the clamp around the pressure vessel.

According to a method of the invention, two components of a pressure vessel can be secured with a band clamp. The method includes providing a clamp lock with a drive rack at least partially coupled to a first end of the band clamp, positioning the drive rack through an adaptor coupled to a second end of the band clamp, and positioning the drive rack into a receiving hole of a housing of the clamp lock. The method also includes advancing the drive rack through the receiving hole until a first notch in the drive rack is engaged by a locking pawl of the housing, positioning the band clamp over the pressure vessel, and further advancing the drive rack through the receiving hole until a second notch in the drive rack is engaged by the locking pawl.

DESCRIPTION OF THE DRAWINGS

FIG. 8 is an exploded perspective view of a filter assembly including the band clamp assembly and the clamp lock of FIG. 1.

DETAILED DESCRIPTION

Figure 1:
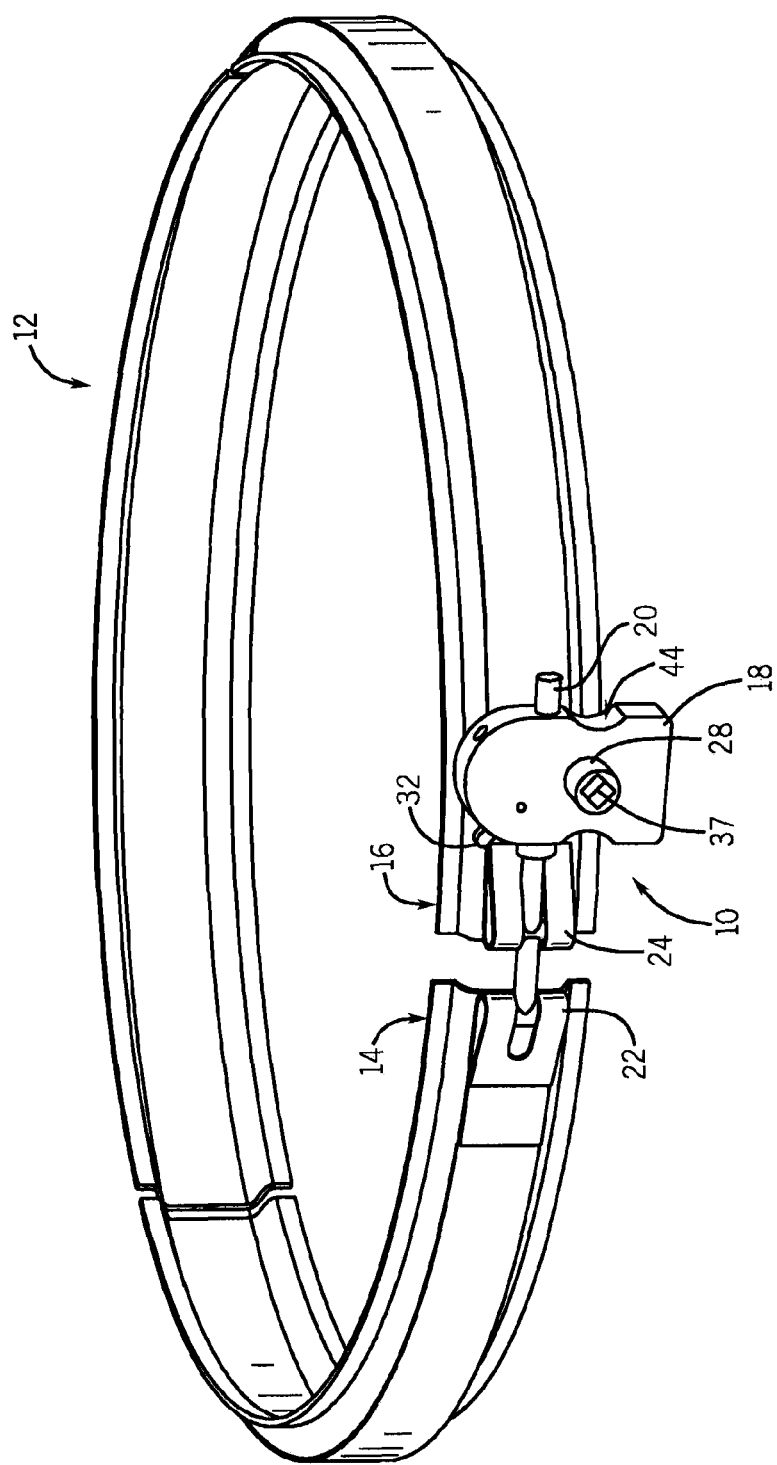
FIG. 1 is a perspective view of a band clamp assembly and a clamp lock according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a clamp lock 10, according to one embodiment of the invention, for use with a band clamp assembly 12. The clamp lock 10 can be used with the band clamp assembly 12 on pressure vessels, such as split tank filters and split pump housings, in order to provide the band clamp assembly 12 with discrete locking positions. The clamp lock 10 can also be used with similar clamping assemblies and on other products that require two components or halves to be secured together.

As shown in FIG. 1, the band clamp assembly 12 can include a first coupling end 14 and a second coupling end 16. Respective portions of the clamp lock 10, such as a housing 18 and/or a drive rack 20 can be coupled to one or both of the first coupling end 14 and the second coupling end 16 in order to couple together the first coupling end 14 and the second coupling end 16. In some embodiments, the drive rack 20 and the housing 18 can be directly coupled to the first coupling end 14 and the second coupling end 16, respectively. In other embodiments, the housing 18 and/or the drive rack 20 can be indirectly coupled to the first coupling end 14 and/or the second coupling end 16. In yet other embodiments, the housing 18 and/or the drive rack 20 can be separable (e.g., freestanding) from one or both of the first coupling end 14 and the second coupling end 16. For example, as shown in FIG. 1, the drive rack 20 can be indirectly coupled to the first coupling end 14 via a first coupling adaptor 22. The drive rack 20 can also be indirectly coupled and separable from the second coupling end 16 via a second coupling adaptor, or sleeve 24 (e.g., by threading the drive rack 20 through the sleeve 24). The housing 18 can be separable from the band clamp assembly 12 and can be coupled to the drive rack 20 in order to secure the first coupling end 14 and the second coupling end 16 together at one or more locking positions, as further described below.

Figure 2:
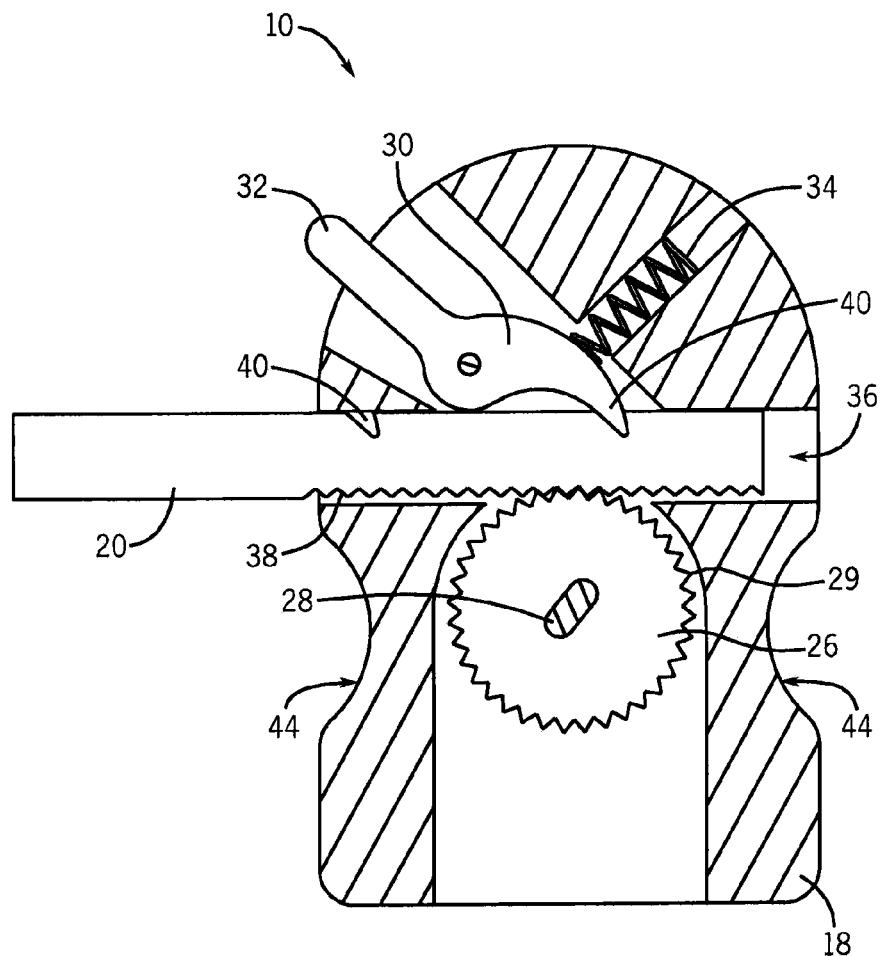
FIG. 2 is a front cross-sectional view of the clamp lock of FIG. 1 according to one embodiment of the invention.
Figure 3:
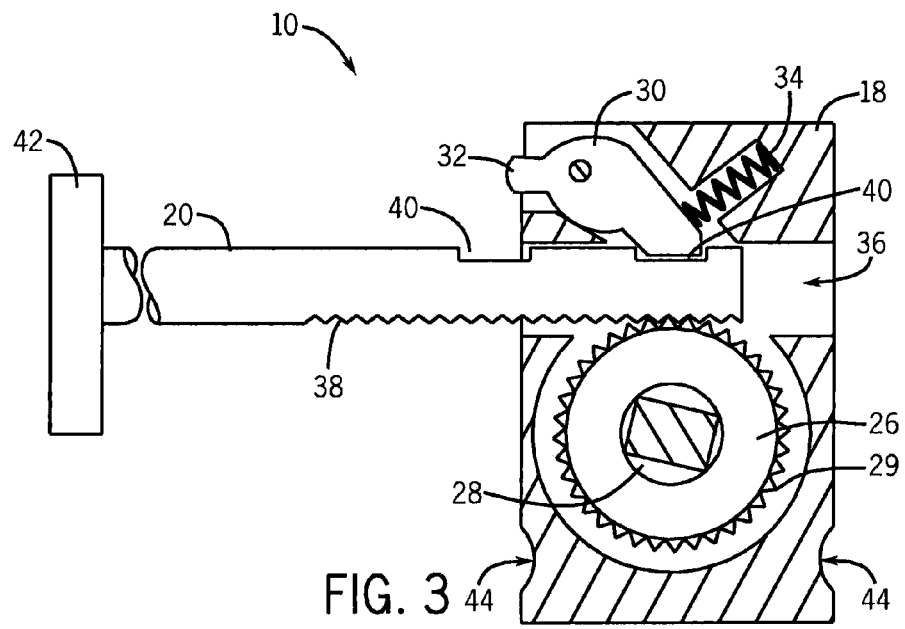
FIG. 3 is a front cross-sectional view of a clamp lock, according to another embodiment of the invention, in an installation position.
Figure 4:
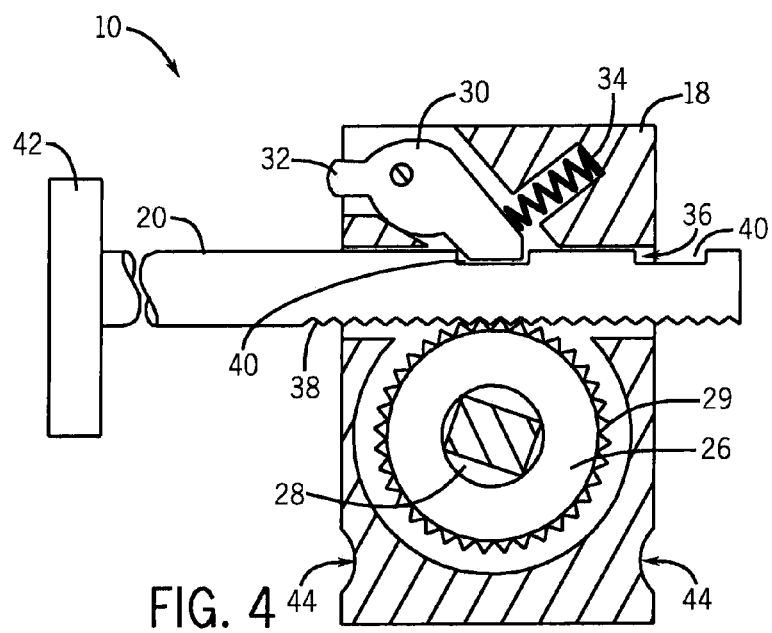
FIG. 4 is a front cross-sectional view of the clamp lock of FIG. 3 in an operation position.

FIGS. 2-4 illustrate the clamp lock 10 according to some embodiments of the invention. As shown in FIGS. 2-4, the clamp lock 10 can include the housing 18 and the drive rack 20. The housing 18 can include a drive gear 26 with a drive shaft 28 and teeth 29 at least partially around its circumference. The housing 18 can also include a locking pawl 30 with a pawl release tab 32, a pawl tension spring 34, and a receiving hole 36 extending through the housing 18. The drive gear 26 can at least partially extend into the receiving hole 36. In addition, at least a portion of the drive shaft 28 can extend out from the housing 18, as shown in FIG. 1, for manual rotation of the drive gear 26 by a user. In some embodiments, as shown in FIG. 1, the drive shaft 28 can include a stamped portion 37 to facilitate use of a tool (not shown) for manually rotating the drive gear 26.

The drive rack 20 can include a coupling arm 42 at one end, as shown in FIGS. 1, 3, and 4, to facilitate coupling the drive rack 20 to the band clamp assembly 12 (e.g., to the first coupling adaptor 22). The drive rack 20 can be inserted through the receiving hole 36 of the housing 18 and can include two separate components to facilitate advancing the drive rack 20 through the receiving hole 36 and locking the drive rack 20 in place in the receiving hole 36, respectively. More specifically, the drive rack 20 can include a toothed portion 38 on at least one side and one or more locking position notches 40 on at least another side. The toothed portion 38 can engage the teeth 29 of the drive gear 26 to facilitate advancing the drive rack 20 through the receiving hole 36. As a result, lateral movement of the drive rack 20 through the receiving hole 36 can cause rotation of the drive gear 26. Alternatively, rotation of the drive gear 26 (e.g., manual rotation by the user) can cause lateral movement of the drive rack 20. In some embodiments, as shown in FIGS. 1-4, the housing 18 can include tabs 44 or other indentations to facilitate holding the housing 18 while inserting the drive rack 20 and/or rotating the drive shaft 28.

As shown in FIGS. 2-4, the pawl tension spring 34 can substantially force the locking pawl 30 into a position that extends into the receiving hole 36. When the drive rack 20 is inserted through the receiving hole 36, the locking pawl 30 can drag against the drive rack 20 until the locking pawl 30 engages one of the locking position notches 40 in order to substantially "lock" the drive rack 20 in place. More specifically, in one embodiment, the locking pawl 30 can be shaped to prevent further lateral movement of the drive rack 20 in one direction (e.g., in order to prevent loosening the band clamp assembly 12), but still allow further lateral movement of the drive rack 20 in the other direction (e.g., in order to allow further tightening of the band clamp assembly 12). In order to disengage the locking pawl 30 from the locking position notch 40, the pawl release tab 32 can be pressed by a user, causing an upward rotation or movement of the locking pawl 30. As a result of pressing the release tab 32, the force of the spring 34 pressing the locking pawl 30 into the locking position notch 40 can be overcome and the locking pawl 30 can be raised out of the locking position notch 40, thus allowing lateral movement of the drive rack 20 in either direction.

In other embodiments, the locking pawl 30 can be substantially pin-shaped, and the locking position notch 40 can be a hole at least partially extending through the drive rack 20. The locking position notch 40 can receive the pin-shaped locking pawl 30 in order to lock the drive rack 20 in place. In such embodiments, the pawl release tab 32 can be pressed to release the locking pawl 30 out of the locking position hole 40. In addition, in such embodiments, the engagement of the pin-shaped locking pawl 30 in the locking position hole 40 can substantially prevent lateral movement of the drive rack 20 in either direction.

In addition, in some embodiments, the locking pawl 30 and the drive gear 26 do not necessarily need to extend into the receiving hole 36, but at least into the lateral movement path of the drive rack 20 after it is received into the receiving hole 36. For example, the receiving hole 36 may only extend through a portion or portions of the housing 18 in order to align the drive rack 20 along a lateral movement path. As a result, the locking pawl 30 and the drive gear 26 can extend into a portion of the lateral movement path that is easily viewable by the user, instead of being enclosed in the housing 18.

The locking position notches 40 can provide distinct or discrete locking positions for the clamp lock 10. In some embodiments, the clamp lock 10 can include two locking position notches 40 providing a first locking position (e.g., an installation position) when the drive rack 20 is inserted a first distance into the receiving hole 36, and shown in FIG. 3, and a second locking position (e.g., a secured, or operation position) when the drive rack 20 is inserted a second distance into the receiving hole 36, as shown in FIG. 4. The first distance and the second distance can correlate to a first diameter and a second diameter, respectively, of the band clamp assembly 12. More specifically, placing the clamp lock 10 in the installation position can force the band clamp assembly 12 to have the first diameter, and placing the clamp lock 10 in the operation position can force the band clamp assembly 12 to have the second diameter. For example, the first diameter of the installation position can be sufficient to permit easier installation of the band clamp assembly 12 onto a product (e.g., a pressure vessel) by allowing the user to install the band clamp assembly 12 over the two halves of the product without the first coupling end 14 and the second coupling end 16 separating from each other. The second diameter of the operation position can be of sufficient size to secure the band clamp assembly 12 around the product in a locked manner for proper operation of the product.

More specifically, the user can assemble the band clamp assembly 12 by guiding the drive rack 20 coupled to the first coupling end 14 (e.g., via the first coupling adaptor 22 and the coupling arm 42) through the sleeve 24 of the second coupling end 16. The user can then slide the housing 18 onto the drive rack 20 by inserting the drive rack 20 through the receiving hole 36, as shown in FIG. 1. The drive gear 26 inside of the housing 18 engages the toothed portion 38 of the drive rack 20 and further sliding of the drive rack 20 a first distance can permit engagement of the locking pawl 30 into the first locking position notch 40 (as shown in FIGS. 2 and 3). The user can then install the band clamp assembly 12 over the two halves of the product without the first coupling end 14 and the second coupling end 16 separating from each other. When the band clamp assembly 12 is correctly positioned over the product, the user can continue sliding the drive rack 20 by hand, or using a tool (not shown) on the drive shaft 28 to rotate the drive gear 26. This further sliding of the drive rack 20 or rotation of the drive gear 26 advances the housing 18 along the drive rack 20 until the locking pawl 30 engages into the second locking position notch 40 (e.g., at the second distance). This can be considered the secured or operation position. Once in the operation position, the product can be properly operated under pressure and the band clamp assembly 12 can substantially prevent separation of the two halves of the product. In some embodiments, the clamp lock 10 can include a single locking position notch 40 so that the band clamp assembly 12 is only capable of being locked in the operation position.

For removal of the band clamp assembly 12 from the product, the housing 18 can be initially slid by hand or the drive gear 26 can be rotated by a tool on the drive shaft 28 in the tightening direction in order to remove some tension from the locking pawl 30. The locking pawl 30 can then be rotated out of engagement with the locking position notch 40 by the pawl release tab 32. Once the locking pawl 30 is released from the locking position notch 40, the housing 18 can be slid outward along the drive rack 20 to either the installation position or until the housing 18 is completely separated from the drive rack 20. The initial tightening requirement to release the locking pawl 30 can act as a safety feature to prevent unintentional unlocking when the pawl release tab 32 is bumped or accidentally pressed.

Figure 5:
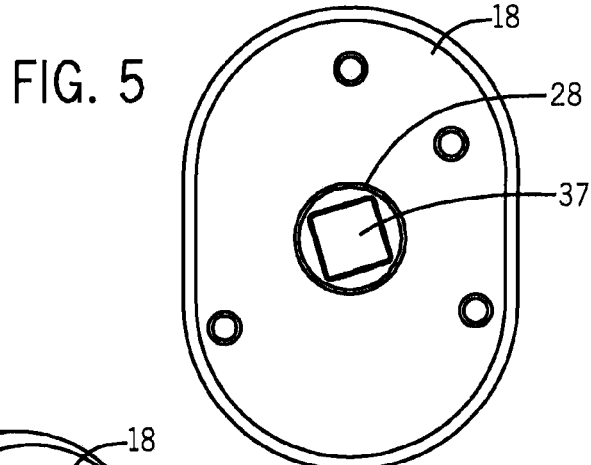
FIG. 5 is a front view of a clamp lock housing according to one embodiment of the invention.
Figure 6:
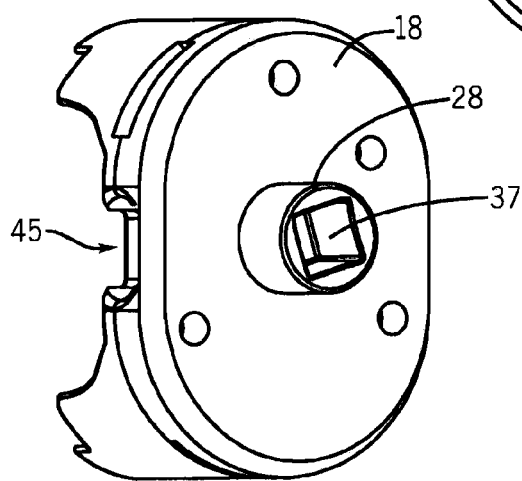
FIG. 6 is a front perspective view of the clamp lock housing of FIG. 5.
Figure 7:
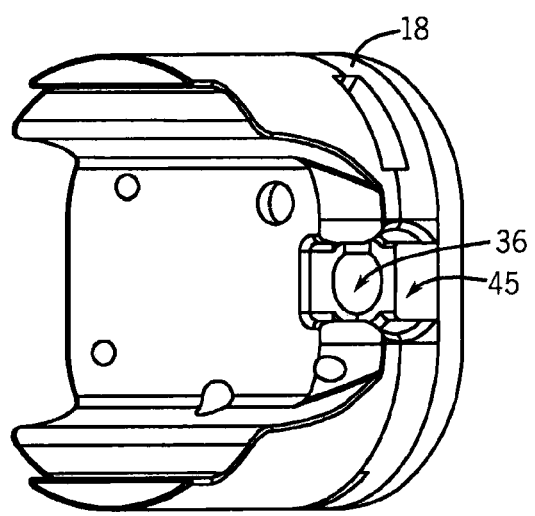
FIG. 7 is a rear perspective view of the clamp lock housing of FIG. 5.

FIGS. 5-7 illustrate the housing 18 according to another embodiment of the invention. As shown in FIGS. 5 and 6, the housing 18 can include the drive shaft 28 and the stamped portion 37 to facilitate use of a tool (not shown) for manually rotating the internal drive gear 26. As shown in FIGS. 6 and 7, the back and/or side of the housing 18 can be shaped to fit the profile of the band clamp assembly 12 so that both the drive rack 20 and the housing 18 can be supported. This can substantially minimize or prevent bending of both components when the clamp lock 10 is tightened to the installation position or the operation position. In addition, as shown in FIG. 7, an entry region 45 of the receiving hole 36 can be designed to ensure proper alignment of the drive rack 20 with the housing 18 for easier insertion.

As discussed above, the band clamp assembly 12, including the clamp lock 10 according to some embodiments, can include a single installation position and a single operation position (or only the single operation position). The installation position can facilitate rapid installation of the band clamp assembly 12 onto a product, and the single operation position can ensure that the band clamp assembly 12 is secured tightly around the product without the user having to guess or estimate whether the tightening is sufficient. This can prevent the band clamp assembly 12 from being too loose or too tight during operation of the product, and thus can also prevent failure of the band clamp assembly 12, which may result in forced separation of the two product halves or units.

FIG. 8 illustrates an example split tank pool filter 46 including the band clamp assembly 12 and the clamp lock 10 of some embodiments of the invention. The split tank filter 46 can include a cover 48, a bottom tank 50, a pressure gauge 52, an air relieve valve 54, a hose 56, a compression spring 58, an air bleed tube assembly 60, a top manifold 62 and a bottom manifold 64, filter cartridge elements 66, a back-up ring 68, a gasket 70, an o-ring 72, and the band clamp assembly 12. The bottom tank 50 can include inlet piping 74, outlet piping 76, a bulkhead union 78, a drain o-ring 80, a drain plug 82, and a baffle 84. The cover 48 and the bottom tank 50 can be separable units which, when coupled together, substantially enclose the other components of the split tank filter 46. The back-up ring 68, the gasket 70, and the o-ring 72 can provide substantial sealing at the junction between the cover 48 and the bottom tank 50. The band clamp assembly 12 (e.g., when in the installation position) can be installed over the cover 48 and positioned around the junction between the cover 48 and the bottom tank 50. Once installed in position, the band clamp assembly 12 can be tightened or adjusted to the operation position, as described above, to allow operation of the split tank filter 46. The band clamp assembly 12, in the operation position, can substantially prevent the cover 48 from exploding away from the bottom tank 50 due to increased pressure inside the split tank filter 46.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A clamp lock to secure a band clamp around a pressure vessel, the clamp lock comprising:
  a drive rack including a first end and a second end, wherein the first end of the drive rack is coupled to a first coupling adaptor disposed on a first end of the band clamp and the drive rack passes through a second coupling adaptor disposed on a second end of the band clamp; and
  a housing including
    a receiving hole extending at least partially through the housing to receive the drive rack,
    a rotatable drive gear to engage a portion of the drive rack and permit lateral movement of the drive rack through the receiving hole, and
    a locking pawl moveable between a first position that engages the drive rack and substantially prevents lateral movement of the drive rack in at least one direction through the receiving hole, and a second position that is spaced away from the drive rack and permits lateral movement of the drive rack in two directions through the receiving hole, the drive gear being positioned within the housing and engaging a first side of the drive rack and the locking pawl positioned within the housing and engaging an opposing second side of the drive rack.

2. The clamp lock of claim 1, wherein the housing further comprises a pawl spring positioned within a pawl spring recess of the housing which normally forces the locking pawl into the first position.

3. The clamp lock of claim 2, wherein the locking pawl comprises a pawl release tab that, when pressed, overcomes the pawl spring force and moves the locking pawl into the second position.

4. The clamp lock of claim 1, wherein the drive rack includes a toothed portion on a first side of the drive rack to engage the rotatable drive gear.

5. The clamp lock of claim 4, wherein the drive rack includes at least a first locking position notch to engage the locking pawl when the locking pawl is in the first position, and wherein the first locking position notch is located on a second side of the drive rack opposite a first side of the drive rack.

6. The clamp lock of claim 5, wherein the drive rack includes at least a second locking position notch to engage the locking pawl when the locking pawl is in the first position, the second locking position notch being positioned laterally away from the first locking position notch, and wherein the second locking position notch is located on the second side of the drive rack.

7. The clamp lock of claim 6, wherein the band clamp has a first diameter when the drive rack is positioned for the locking pawl to engage the first locking position notch and a second diameter when the drive rack is positioned for the locking pawl to engage the second locking position notch, and wherein the first diameter is larger than the second diameter.

8. A clamp lock that secures together a band clamp around a pressure vessel, the clamp lock comprising:
    a drive rack including at least one notch disposed on a first side of the drive rack and a toothed portion disposed on a second side of the drive rack opposed to the first side; and
    a housing including a rotatable drive gear, a locking pawl, and a receiving hole extending through the housing to receive the drive rack, wherein the receiving hole engages the drive gear and the locking pawl, and the locking pawl is engaged in the one notch, and the clamp has a first diameter when the drive rack is disposed in a first position,
    wherein the first diameter of the clamp sufficient to secure the clamp around the pressure vessel.

9. The clamp lock of claim 8, wherein the drive rack includes at least one second notch, wherein the drive rack positioned in the receiving hole in a second position engages the locking pawl with the at least one second notch, the second position correlating to a second diameter of the clamp sufficient to allow installation of the clamp over the pressure vessel.

10. The clamp lock of claim 8, wherein the rotatable drive gear includes a drive shaft manually rotatable in order to rotate the drive gear, and teeth positioned around the circumference of the rotatable drive gear, the teeth being capable of engaging the toothed portion of the drive rack so that rotation of the drive gear causes lateral movement of the drive rack through the receiving hole.

11. The clamp lock of claim 8, wherein the locking pawl includes a pawl release tab, wherein actuating the pawl release tab disengages the locking pawl from the at least one notch.

12. The clamp lock of claim 8, wherein one of the drive rack and the housing is coupled to the clamp.

13. The clamp lock of claim 11, wherein the housing includes a pawl tension spring having a first end and a second end, wherein the first end of the pawl tension spring engages an interior surface of a pawl tension spring recess within the housing and the second end of the pawl tension spring engages an end of the locking pawl, and wherein the pawl tension spring forces the locking pawl into engagement with the at least one notch when the drive rack has been inserted a first distance into the receiving hole.

* * * * *